US006075330A

United States Patent [19]

Terk

[11] Patent Number: 6,075,330

[45] Date of Patent: Jun. 13, 2000

[54] OUTDOOR ANTENNA SYSTEM WITH REMOTE CONTROL AND METHOD FOR OPTIMIZING ANTENNA FUNCTION

[75] Inventor: Neil Terk, Laurel Hollow, N.Y.

[73] Assignee: Terk Technologies Corp., Commack, N.Y.

[21] Appl. No.: 08/965,724

[22] Filed: Nov. 7, 1997

[51] Int. Cl.[7] .......... H02P 1/00

[52] U.S. Cl. .......... 318/280; 455/151.1; 455/4

[58] Field of Search .......... 342/359; 348/731, 348/734; 358/191.1, 193.1; 340/828.69, 825.72; 455/151.2, 151.1, 4; 318/280, 16; 359/142, 146, 148; 343/882, 870, 878

[56] References Cited

U.S. PATENT DOCUMENTS

| | | | |
|---|---|---|---|
| 4,205,269 | 5/1980 | Watanabe | 455/4 |
| 4,352,202 | 9/1982 | Carney | 455/151 |
| 4,796,032 | 1/1989 | Sakurai et al. | 342/359 |
| 4,918,363 | 4/1990 | Hollis et al. | 318/626 |
| 5,187,488 | 2/1993 | Van Der Vis . | |
| 5,263,183 | 11/1993 | Owen . | |
| 5,281,975 | 1/1994 | Hugo | 343/766 |
| 5,300,935 | 4/1994 | Yu | 342/359 |
| 5,305,100 | 4/1994 | Choi | 348/159 |
| 5,323,240 | 6/1994 | Amano et al. | 348/731 |
| 5,386,251 | 1/1995 | Movshovich | 348/734 |
| 5,771,015 | 6/1998 | Kirtman et al. | 342/359 |
| 5,812,066 | 9/1998 | Terk et al. | 340/825.72 |
| 5,896,183 | 4/1999 | Terk et al. | 348/706 |

*Primary Examiner*—Brian Sircus
*Assistant Examiner*—Rita Leykin
*Attorney, Agent, or Firm*—Hoffman & Baron, LLP

[57] ABSTRACT

In an antenna system with an antenna disposed outside a building structure, a motor is operatively connected to the antenna for moving the antenna about at least one rotation axis. A wireless control signal receiver is provided for receiving a short-range wireless channel selection signal identifying a broadcast channel. The signal receiver is operatively connected to the motor for energizing the motor in response to the wireless channel selection signal. The signal receiver is an infrared signal receiver located inside the building structure. The antenna system then further includes a signal transmission link extending between the infrared signal receiver and the motor for enabling control of the motor by the infrared signal receiver. Generally, the transmission link is an electrical conductor. However, it is alternatively possible for the link to be a short-range radio link.

20 Claims, 2 Drawing Sheets

OUTDOOR ANTENNA SYSTEM WITH REMOTE CONTROL AND METHOD FOR OPTIMIZING ANTENNA FUNCTION

BACKGROUND OF THE INVENTION

This invention pertains to an antenna system. More particularly, this invention relates to an antenna system with antenna orientation adjustment. This invention also pertains to an associated method for optimizing antenna operation.

It is well known that antennas have a marked directional character, that is, antenna reception sensitivity varies in accordance with signal frequency and antenna orientation relative to the source of the broadcast signal. Similarly, signal strength for a transmitting antenna varies as a function of signal frequency and signal angle about a transmission axis of the antenna. The patterns of signal strength (transmission) or sensitivity (reception) have a generally lobed configuration, i.e., a configuration with lows alternating with highs about the transmission or reception axis of the antenna.

Indoor television antennas such as so-called rabbit ears, are generally manipulated by hand to maximize or optimize reception. Outdoors antennas are generally stationary. Consequently, for outside antennas, reception for the various channels is fixed on installation. Reception is optimized only by matching as best as possible the structure and fixed orientation of the outdoors antenna to the directions of incoming broadcast signals.

Attempts have been made to modify the impedance of an antenna circuit in order to improve signal quality. These attempts have met with limited success. Improvements in signal quality are best attained by maximizing the strength of the received signal.

It is known to automatically adjust the position of an indoor antenna in response to a wireless channel selection signal. A reversible motor is connected to the antenna. The direction of rotor rotation of the motor is reversed each time the motor is energized in response to a wireless channel selection signal. Thus, the indoors antenna is rotated in one direction when a user first activates a remote control unit to change the channel displayed on a television receiver. Subsequently, after the antenna has rotated past an optimal position, the user releases the channel selection button of the remote control unit and again pushes the same button to reverse the rotation of the antenna. The user releases the selected channel selection button when the antenna reaches its optimal orientation for the selected channel.

OBJECTS OF THE INVENTION

An object of the present invention is to provide an antenna system with an outdoors antenna having improved reception characteristics.

A more particular object of the present invention is to provide an outdoor antenna system with adjustment capability.

An even more specific object of the present invention is to provide an outdoor antenna system wherein the position or orientation of the antenna can be adjusted under remote control.

It is an associated object of the present invention to provide a method for optimizing antenna operation for an outdoors antenna.

Yet another object of the present invention is to provide such a method wherein antenna position adjustment is effectuated automatically in response to remote control signals.

These and other objects of the present invention will be apparent from the drawings and descriptions herein.

SUMMARY OF THE INVENTION

These and other objects of the present invention are attained by an antenna system comprising an antenna disposed outside a building structure, a motor operatively connected to the antenna for moving the antenna about at least one rotation axis, and a wireless control signal receiver for receiving a short-range wireless channel selection signal identifying a broadcast channel. The signal receiver is operatively connected to the motor for energizing the motor in response to the wireless channel selection signal.

The wireless channel selection signal may be a radio frequency signal generated by a hand held radio frequency remote control unit. Alternatively, the wireless channel selection signal may be generated by a radio frequency generator in response to an infrared signal produced by a hand held infrared remote control unit.

It is generally contemplated that the signal receiver is an infrared signal receiver located inside the building structure. The antenna system then further comprises a signal transmission link extending between the infrared signal receiver and the motor for enabling control of the motor by the infrared signal receiver. Generally, the transmission link is an electrical conductor. However, it is alternatively possible for the link to be a short-range radio link.

In accordance with another feature of the present invention, a decoder is operatively connected to the signal receiver for decoding the wireless channel selection signal to determine the broadcast channel. It must be appreciated that each television remote control unit has a respective coding format whereby different channel selections, as well as volume and other selections, are encoded. The different coding formats may be programmed into a memory of the decoder. The memory thus stores a table of broadcast channels as a function of different signal codes. Alternatively, the decoder includes a processing module, for example, a programmed modified generic computer circuit, for analyzing wireless control signals during a learning operation to determine a coding format of the wireless control signals and for analyzing the wireless channel selection signal during a normal use operation to determine the broadcast channel encoded in the wireless channel selection signal.

In accordance with a further feature of the present invention, a controller or motor driver is operatively connected on one side to the signal receiver, for example, via a transmission link, and on another side to the motor for operating the motor in response to a signal from the signal receiver to move the antenna to an orientation for optimizing reception of the broadcast channel encoded in the wireless channel selection signal. The antenna system may then includes means for enabling a user to preselect the orientation.

Where the motor is a reversible motor, the antenna control system further comprises means operatively connected to the motor and the signal receiver for reversing the direction of rotor rotation of the motor each time the motor is energized in response to a short-range wireless channel selection signal. Pursuant to this feature of the invention, the outdoors antenna is rotated in one direction when a user first activates a remote control unit to change the channel displayed on a television receiver. Subsequently, after the antenna has rotated past an optimal position, the user releases the channel selection button of the remote control unit and again pushes the same button to reverse the rotation of the antenna. The user releases the selected channel selection button when the antenna reaches its optimal orientation for the selected channel.

A method for optimizing antenna operation utilizes, in accordance with the present invention, a television receiver inside a building structure and an antenna outside of the building structure, the antenna being operatively connected to the television receiver for delivering broadcast signals to the television receiver. The method also utilizes a wireless remote control unit for selecting a broadcast signal for display on the television receiver. The remote control unit is operated to generate a wireless channel selection signal encoding a selected broadcast channel. The wireless broadcast signal is received at a location spaced from the remote control unit and, in response to receiving the wireless channel selection signal, a motor is automatically energized to rotate the antenna about an axis for optimizing reception by the antenna of the selected broadcast signal.

Pursuant to another feature of the present invention, the method further comprises decoding the wireless channel selection signal to determine the broadcast channel. In that event, the energizing of the motor includes operating the motor in accordance with the decoded broadcast channel to move the antenna to an orientation for optimizing reception of the broadcast channel encoded in the wireless channel selection signal.

In accordance with an additional feature of the present invention, the method further comprises automatically computing a difference in angle between an existing orientation of the antenna and a desired orientation. Then, the energizing of the motor includes operating the motor for a time sufficient to rotate the antenna from the existing orientation to the desired orientation.

The decoding of the wireless channel selection signal may include automatically consulting a preprogrammed electronic memory storing a table of broadcast channels as a function of different signal codes. Instead of being preprogrammed at the factory, the table of broadcast channels may be learned or acquired with the help of the user. Thus, the decoding of the channel selection signal includes automatically analyzing wireless control signals during a learning operation to determine a coding format of the wireless control signals and analyzing the wireless channel selection signal during a normal use operation to determine the broadcast channel encoded in the wireless channel selection signal.

DESCRIPTION OF THE PREFERRED EMBODIMENTS

Figure 1:
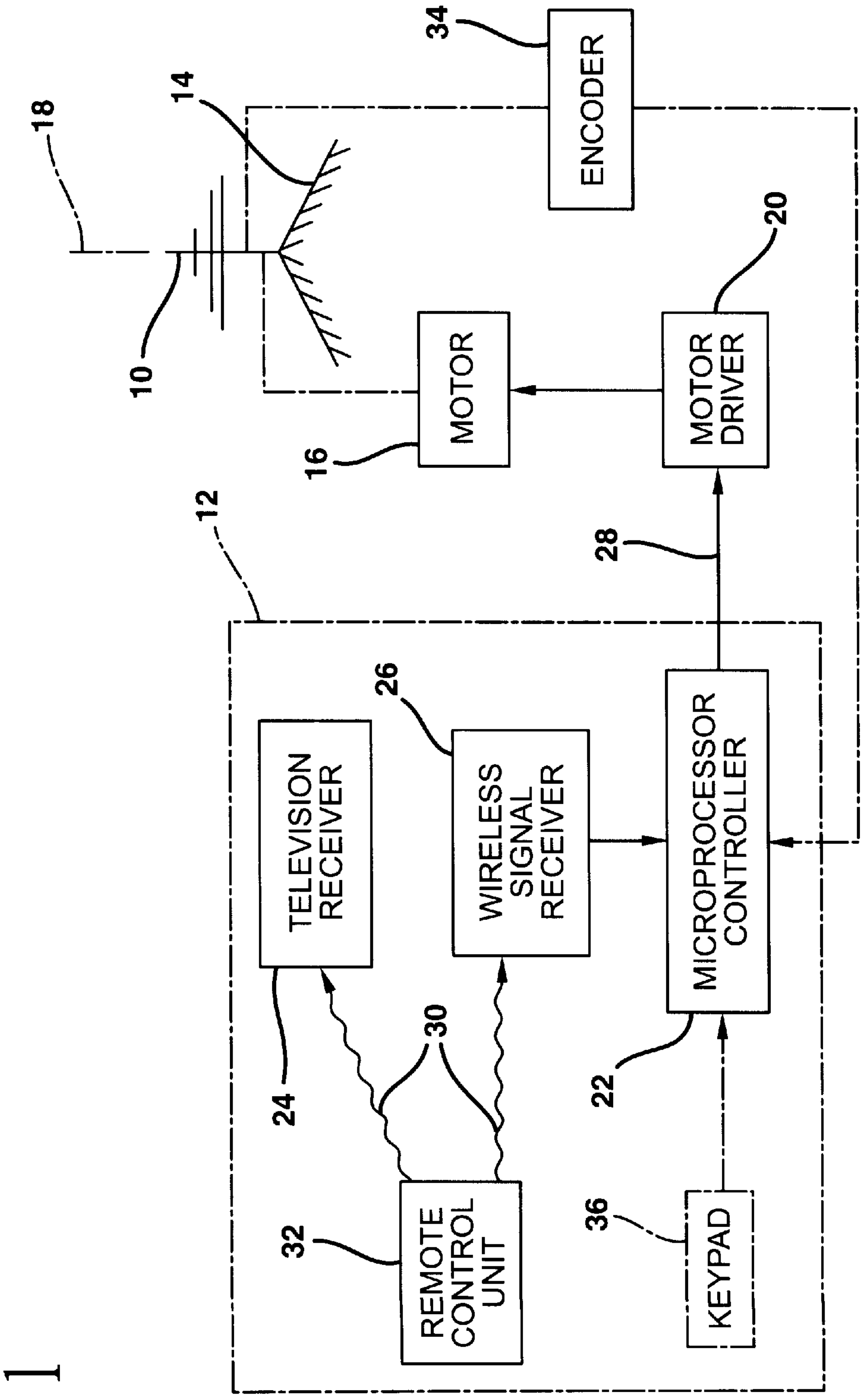
FIG. 1 is a block diagram of an antenna system, particularly an antenna orientation adjustment system, in accordance wit the present invention.

FIG. 1 depicts an antenna system including components for automatic adjustment of the orientation of an outdoors antenna 10 disposed outside a building structure 12, for example, on a roof gable 14. A motor 16 is operatively connected to antenna 10 for turning the antenna about at least one rotation axis 18. Motor 16 is responsive to signals from a motor driver 20 which in turn is controlled by a microprocessor 22 via a hard-wired or conductor type transmission link 28. Specifically transmission link 28 may be the coaxial cable which carries television signals from antenna 10 to television receiver 24. An interface (not shown) is provided for tapping into the coaxail cable for purposes of extracting an encoded control signal directed to motor driver 20 from microprocessor 22.

Microprocessor 22 is generally disposed inside a housing or casing (not shown) which is placed near a television receiver 24 inside building structure 12. That housing or casing also includes a wireless signal receiver 26 which generally takes the form of an infrared sensor. Signal receiver 26 senses a short-range wireless channel selection signal 30 which is emitted by a hand-held remote control unit 32 in response to an actuation of that unit by a user. Remote control unit 32 is used to control, among other functions, channel selections displayed on television receiver 26. Remote control unit 32 generally encodes the channel selections and other functions in an infrared signal which has timing characteristics and digit signal codes peculiar to a particular manufacturer or product line. If remote control unit 32 is an infrared signal generator, it must typically be located in the same room of building structure 12.

Signal receiver 26 is connected to microprocessor 22 for informing the microprocessor at least about the emission of channel selection signal 30 by remote control unit 32. In one embodiment of the antenna orientation adjustment system of FIG. 1, microprocessor 22 activates motor driver 20 to energize motor 16 to rotate antenna 10 about axis 18 as long as the channel selection signal 30 is being transmitted from remote control unit 32 to signal receiver 26. If the signal transmission ceases, microprocessor 22 ceases the energization of motor 16 via driver 20. Upon a subsequent generation of a channel selection signal 30, microprocessor 22 causes motor 16 to rotate antenna 10 in the opposite direction about axis 18. In this way, the user of remote control unit 32 controls the orientation of antenna 10. Upon selecting a desired broadcast channel, the user repeatedly actuates the same channel selection button of remote control unit 32 to fine tune the antenna's orientation in an iterative process. Each successive actuation turns the antenna back in the opposite direction with respect to the previous actuation. After rotating antenna 10 past an optimal orientation for a selected channel, the user releases the selected channel selection button and then actuates it again to return the antenna to the optimal orientation.

In an alternate embodiment of the antenna orientation adjustment system of FIG. 1, signal receiver 26 provides microprocessor 22 with the information content of wireless channel selection signal 30. Microprocessor 22 interprets or decodes the signal to determine the identity of the selected broadcast channel. The microprocessor then sends signals to motor driver 20 for rotating the rotor of motor 16 and antenna 10 so that the antenna assumes a predetermined optimal orientation for the selection broadcast channel. To that end, a position encoder 34 provides a feedback signal to microprocessor 22 for informing the microprocessor of the actual orientation of antenna 10. The optimal orientation is programmed by the user during a calibration or setting procedure prior to regular use of the antenna orientation adjustment system. During the calibration or setting procedure, the user actuates keys of a keypad 36 to indicate to microprocessor the various local broadcast channels and their respective optimal antenna orientations.

Figure 2:
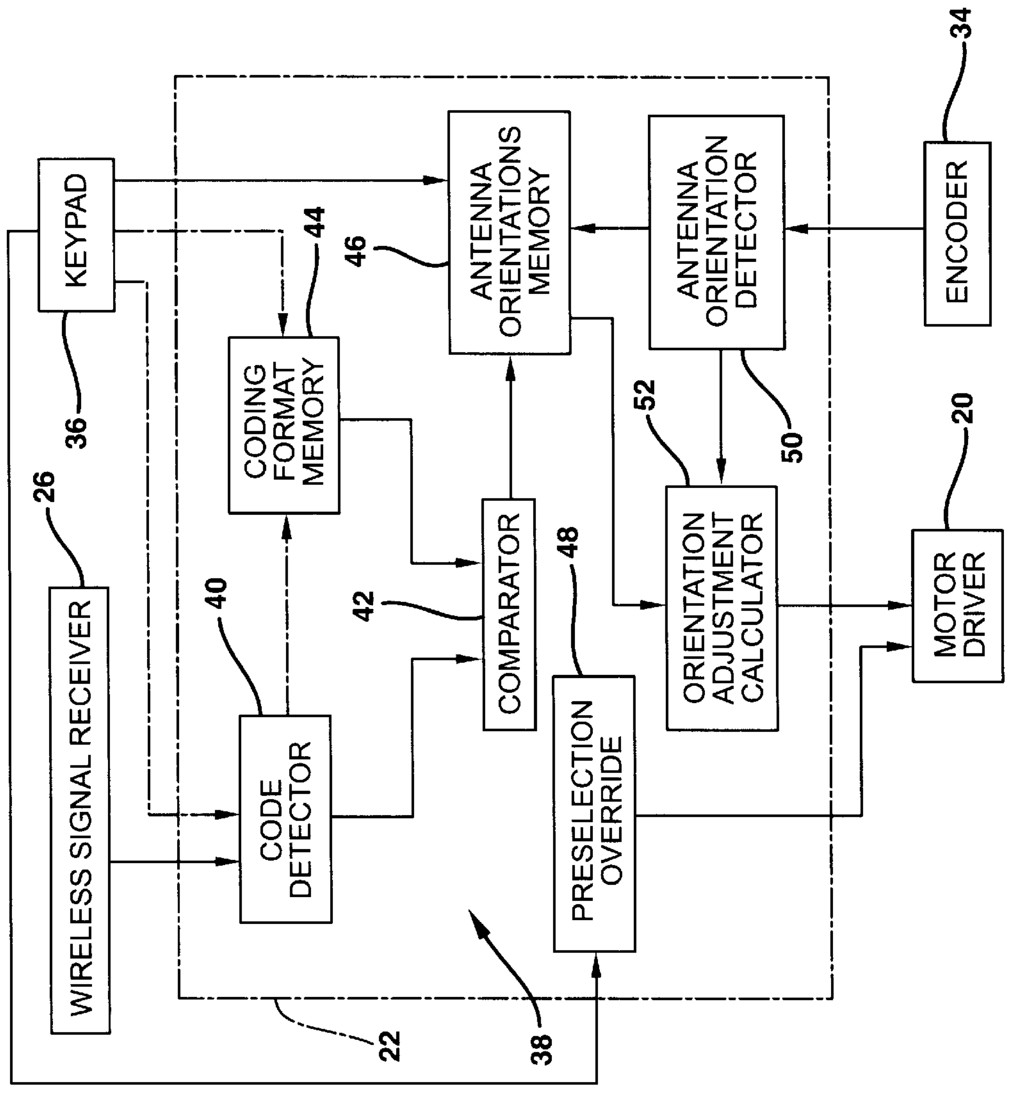
FIG. 2 is a block diagram of functional blocks of a microprocessor controller shown in FIG. 1, the functional blocks corresponding to a particular implementation of the antenna orientation adjustment system of FIG. 1.

For the alternate embodiment of the antenna orientation adjustment system of FIG. 1, FIG. 2 shows that microprocessor 22 includes several functional blocks or modules which are realized in practice as generic digital computer circuits modified by programming to perform the indicated functions. A decoder 38 is operatively connected to signal receiver 26 for decoding wireless channel selection signal 30 to determine the broadcast channel. Decoder 38 includes a code detector module 40 which detects the timing characteristics of the incoming infrared signal. The detected code is delivered by code detector module 40 to a comparator 42 which addresses a memory 44 containing a table associating the different infrared channel selection codes with the respective broadcast channels. Memory 44 and comparator 42 are also parts of decoder 38. Memory 44 may be a factory-programmed memory chip where the table contains the channel codes for several, if not all, existing coding formats. Thus, comparator 42 will be able to identify a selected broadcast channel regardless of the make, model and manufacturer of remote control unit 32. Comparator 42 compares an incoming code with the codes in memory 44 until a match is detected.

In another configuration, memory 44 is programmed by the user with the aid of keypad 36. Memory 44 contains a table whose entries are filled in during a calibration procedure. Keypad 36 is initially actuated to indicate the commencement of the calibration procedure. Subsequently, keypad 36 is used to successively indicate the various local broadcast channels while remote control unit is actuated to transmit respective successive channel selection signals 30 corresponding to the channels indicated via keypad 36. This kind of learning procedure is described in U.S. Pat. No. 5,386,251 to Movshovich, the disclosure of which is hereby incorporated by reference.

Keypad 36 is also used to set or preselect optimal antenna orientations for the different local broadcast channels. These optimal antenna orientations or angles are stored in a second memory 46 of microprocessor 22. In an exemplary setting procedure, the user communicates the commencement of the setting procedure to microprocessor 22 via keypad 36. More specifically, to set the desired antenna orientation for a particular broadcast channel, the user actuates keypad 36 to send a rotation control signal to a preselection override module 48 of microprocessor 22. In response to the rotation control signal, module 48 induces the rotation of antenna 10 in one direction or another via motor 16 and driver 20. Once the antenna passes and optimal orientation of the particular broadcast channel the user changes the rotation control signal, by pressing a different key, to rotate the antenna in the opposite direction back to the observed optimal orientation. Keypad 36 is then used to activate memory 46 to store the identity of the particular channel and the corresponding optimal orientation. The particular value of the optimal orientation is supplied to memory 46 by an orientation detector module 50 which tracks the orientation of antenna 10 in response to input signals from encoder 34.

After the user has programmed the optimal antenna orientations for all local broadcast channels of interest, normal use can be made of the antenna orientation adjustment system. Decoder analyzes wireless channel selection signal 30 from remote control unit 32 to determine the particular selected channel. More specifically, comparator 42 determines the particular selected channel by consulting memory 44. Comparator 42 then induces memory 46 to transmit the respective preselected optimal antenna orientation or angle to an orientation adjustment calculation module 52. Module 52 compares the desired orientation or angle from memory 46 with the current actual antenna orientation or angle as determined by detector module 50 and computes a direction and amount of adjustment, or motor operation time, required to bring the antenna from the current orientation to the preset optimal orientation for the selected broadcast channel.

The use of a microprocessor for controlling antenna position is described in U.S. Pat. No. 5,300,935 to Yu. In accordance with the teachings of that patent, a microprocessor adjusts antenna position in response to user input from a keyboard. The driving of the antenna positioning motor in that prior art reference may be adapted for use in the present antenna orientation adjustment system. Accordingly, the teachings of U.S. Pat. No. 5,300,935 are hereby incorporated by reference.

Although the invention has been described in terms of particular embodiments and applications, one of ordinary skill in the art, in light of this teaching, can generate additional embodiments and modifications without departing from the spirit of or exceeding the scope of the claimed invention. For example, wireless channel selection signal 30 may be a radio frequency signal generated by a hand held radio frequency remote control unit. Also, the infrared signal may be sensed and converted to a short-range radio wave signal for transmission to a radio signal detector outside of building structure 12, proximate to motor 16. Accordingly, it is to be understood that the drawings and descriptions herein present examples to facilitate comprehension of the invention and should not be construed to limit the scope thereof.

What is claimed is:

1. An antenna system comprising:

an antenna disposed outside a building structure;

a coaxial cable extending from said antenna to a television receiver located inside said building structure;

a motor operatively connected to said antenna for moving said antenna about at least one rotation axis;

a wireless control signal receiver for receiving a short-range wireless channel selection signal identifying a broadcast channel, said signal receiver being operatively connected to said motor via said coaxial cable for energizing said motor in response to said wireless channel selection signal, said signal receiver being an infrared signal receiver located inside said building structure, said signal receiver including a signal transmission link extending between said infrared signal receiver and said motor for enabling control of said motor by said infrared signal receiver; and a decoder operatively connected to said signal receiver for decoding said wireless channel selection signal to determine said broadcast channel, said decoder including processing means for analyzing wireless control signals during a learning operation to determine a coding format of said wireless control signals and for analyzing said wireless channel selection signal during a normal use operation to determine said broadcast channel encoded in said wireless channel selection signal.

2. The system defined in claim 1, further comprising a motor driver operatively connected on one side to said coaxial cable and on another side to said motor for operating said motor in response to a signal from said signal receiver to move said antenna to an orientation for optimizing reception of the broadcast channel encoded in said wireless channel selection signal.

3. The system defined in claim 2, further comprising means for enabling a user to preselect said orientation.

4. The system defined in claim 1 wherein said decoder includes preprogrammed memory storing a table of broadcast channels as a function of different signal codes.

5. The system defined in claim 1 wherein said motor is a reversible motor, further comprising means operatively connected to said motor and said signal receiver for reversing the direction of rotor rotation of said motor each time said motor is energized in response to a short-range wireless channel selection signal.

6. The system defined in claim 1, further comprising a decoder operatively connected to said signal receiver for decoding said wireless channel selection signal to determine said broadcast channel.

7. The system defined in claim 6 wherein said decoder includes preprogrammed memory storing a table of broadcast channels as a function of different coding formats.

8. The system defined in claim 1, further comprising a motor driver operatively connected on one side to said coaxial cable and on another side to said motor for operating said motor in response to a signal from said signal receiver to move said antenna to an orientation for optimizing reception of the broadcast channel encoded in said wireless channel selection signal.

9. The system in claim 8, further comprising means for enabling a user to preselect said orientation.

10. An antenna system comprising:

an antenna disposed outside a building structure;

a coaxial cable extending from said antenna to a television receiver located inside said building structure;

a motor operatively connected to said antenna for moving said antenna about at least one rotation axis;

a wireless control signal receiver for receiving a short-range wireless channel selection signal identifying a broadcast channel, said signal receiver being operatively connected to said motor via said coaxial cable for energizing said motor in response to said wireless channel selection signal; and a decoder operatively connected to said signal receiver for decoding said wireless channel selection signal to determine said broadcast channel, said decoder including processing means for analyzing wireless control signals during a learning operation to determine a coding format of said wireless control signals and for analyzing said wireless channel selection signal during a normal use operation to determine said broadcast channel encoded in said wireless channel selection signal.

11. The system defined in claim 10 wherein said motor is a reversible motor, further comprising means operatively connected to said motor and said signal receiver for reversing the direction of rotor rotation of said motor each time said motor is energized in response to a short-range wireless channel selection signal.

12. The system defined in claim 10, further comprising a decoder operatively connected to said signal receiver for decoding said wireless channel selection signal to determine said broadcast channel.

13. The system defined in claim 12 wherein said decoder includes preprogrammed memory storing a table of broadcast channels as a function of different coding formats.

14. The system defined in claim 10, further comprising a motor driver operatively connected on one side to said coaxial cable and on another side to said motor for operating said motor in response to a signal form said signal receiver to move said antenna to an orientation for optimizing reception of the broadcast channel encoded in said wireless channel selection signal.

15. The system defined in claim 14, further comprising means for enabling a user to preselect said orientation.

16. A method for optimizing antenna operation, comprising:

providing a television receiver inside a building structure and an antenna outside of said building structure, said antenna being operatively connected to said television receiver via a coaxial cable for delivering broadcast signals to said television receiver;

providing a wireless remote control unit for selecting a broadcast signal for display on said television receiver;

operating said remote control unit to generate a wireless channel selection signal encoding a selected broadcast channel;

receiving said wireless broadcast signal at a location spaced from said remote control unit;

in response to receiving said wireless channel selection signal, generating a control signal on said coaxial cable to automatically energize a motor to rotate said antenna about an axis for optimizing reception by said antenna of said selected broadcast signal, said motor being operatively connected to said coaxial cable; and decoding said wireless channel selection signal to determine said broadcast channel, said control signal operating said motor in accordance with the decoded broadcast channel to move said antenna to an orientation for optimizing reception of the broadcast encoded in said wireless channel selection signal, the decoding of said channel selection signal including automatically analyzing wireless control signals during a learning operation to determine a coding format of the wireless control signals and analyzing said wireless channel selection signal during a normal use operation to determine said broadcast channel encoded in said wireless channel selection signal.

17. The method defined in claim 16 wherein said orientation is a desired orientation, further comprising automatically computing a difference in angle between an existing orientation of said antenna and said desired orientation, said motor being operated for a time sufficient to rotate said antenna from said existing orientation to said desired orientation.

18. The method defined in claim 16 wherein the decoding of said wireless channel selection signal includes consulting a preprogrammed electronic memory storing a table of broadcast channels is as a function of different signal codes.

19. The method defined in claim 16 wherein said motor is a reversible motor, further comprising reversing the direction of rotor rotation of said motor each time said motor is energized in response to a short-range wireless channel selection signal.

20. A method for optimizing antenna operation, comprising:

providing a television receiver inside a building structure and an antenna outside of said building structure, said antenna being operatively connected to said television receiver for delivering broadcast signals to said television receiver;

also providing an infrared wireless remote control unit for selecting a broadcast signal for display on said television receiver;

operating said remote control unit to generate an infrared wireless channel selection signal encoding a selected broadcast channel;

receiving said infrared wireless broadcast signal at a location spaced from said remote control unit;

converting the received infrared wireless channel selection signal to a short-range radio wave signal;

transmitting said short-range radio signal through said building structure to a radio signal detector disposed outside of said building structure; and in response to said short-range radio signal, automatically energizing a motor to rotate said antenna about an axis for optimizing reception by said antenna of said selected broadcast signal, said radio signal detector being operatively connected to said motor.

* * * * *